United States Patent

Wilson et al.

[11] 3,817,580
[45] June 18, 1974

[54] TRACTOR ADJUSTABLE TREAD WHEEL CONSTRUCTION

[75] Inventors: Raymond W. Wilson, Washington; Charles E. McKeon, Birmingham, both of Mich.

[73] Assignee: Ford Motor Company, Dearborn, Mich.

[22] Filed: Nov. 3, 1972

[21] Appl. No.: 303,571

[52] U.S. Cl. .................................. 301/1, 301/128
[51] Int. Cl. ........................................... B60b 37/04
[58] Field of Search ............ 301/1, 128; 287/52.05, 287/52.06

[56] References Cited
UNITED STATES PATENTS

| | | | |
|---|---|---|---|
| 2,151,045 | 3/1939 | Ploehn | 301/128 |
| 2,751,255 | 6/1956 | Schroeder | 301/1 |
| 3,279,831 | 10/1966 | Smelcer | 301/1 |
| 3,404,908 | 10/1968 | Palmer | 301/1 |
| 3,718,170 | 2/1973 | Caron | 301/1 |

Primary Examiner—Robert S. Ward, Jr.
Assistant Examiner—Reinhard J. Eisenzopf
Attorney, Agent, or Firm—William E. Johnson; Keith L. Zerschling; Peter F. Hilder

[57] ABSTRACT

An adjustable gauge tractor wheel for clamping on an axle has non-circular surfaces for clamping on a non-circular portion of the axle and a wedging construction comprising a gib received within the wheel hub and having a pair of inclined plane surfaces confronting the axle. A pair of wedges extending between the plane surfaces of the gib and the axle are forced into wedging position by a bolt engaging both wedges. Reverse rotation of the bolt retracts the wedges for adjustment of the wheel.

1 Claim, 3 Drawing Figures

PATENTED JUN 18 1974 3,817,580

TRACTOR ADJUSTABLE TREAD WHEEL CONSTRUCTION

This invention relates to agricultural tractors, and more particularly to adjustable gauge driving wheels for such tractors.

It is customary to provide agricultural tractors with adjustable gauge wheels so that the tread width or spacing between opposite wheels can be changed as required for cultivation or harvesting of row crops. In many tractors of this type, an axle shaft projects from each side of the rear axle housing and the wheels may be slid along the projecting portion of the axle shafts and clamped in selected position. The present invention relates to an improved clamping construction for such wheels.

In the construction of the present invention, the wheel hub is provided with a hole for receiving the axle and surfaces for engaging non-cylindrical portions of the axle shaft. A gib extends through the hub beside the shaft and interfits with the margin of the hole in the hub. Oppositely inclined wedge surfaces on the face of the gib confronting the axle shaft cooperate with a pair of wedges extending between the gib and axle and a bolt threadedly engaged with the wedges serves to move the wedges in one direction to wedge the hub on the shaft and in the opposite direction to release the hub for adjustment.

Among the objects of the present invention are to provide a simple and dependable tractor adjustable gauge wheel construction which is economical to manufacture, long lived and easily operated; and to provide a generally improved adjustable gauge wheel construction.

Other objects, and objects relating to details of construction and operation will be more apparent from the detailed description to follow.

Figure 1:
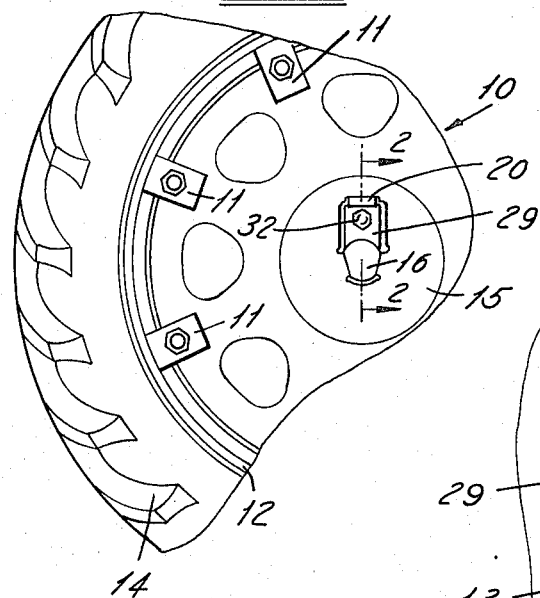
FIG. 1 is a side elevation of a tractor wheel and axle assembly embodying the construction of the present invention, a portion of the wheel being broken away.

Referring now to the drawings, an adjustable gauge tractor wheel 10 is shown in FIG. 1. This wheel has a series of lugs 11 for holding a rim 12 onto the wheel. A rubber tire 14 is mounted on the rim 12.

Figure 3:
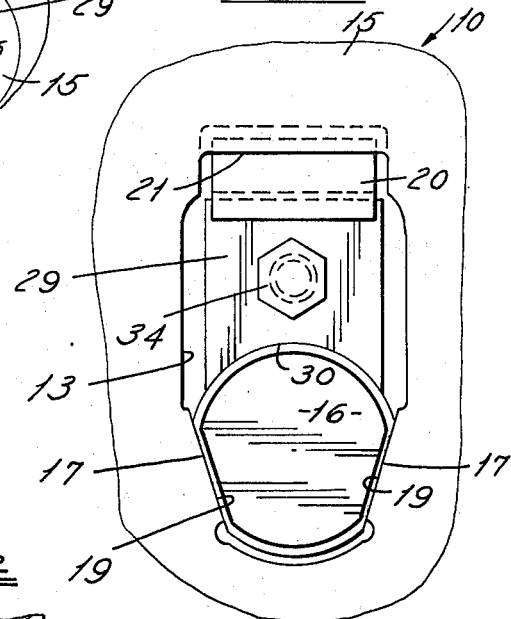
FIG. 3 is an enlarged elevation of the hub portion of the wheel, the axle being shown in end elevation.
Figure 2:
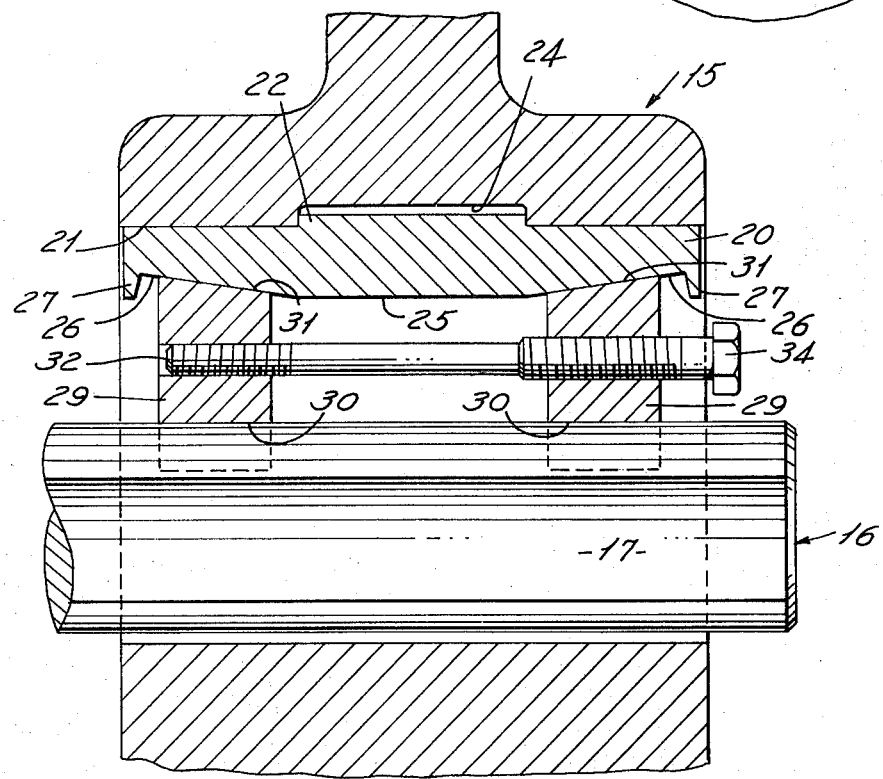
FIG. 2 is an enlarged cross-section of the wheel hub taken on the line 2—2 of FIG. 1, the axle being shown in side elevation.

The wheel 10, which may be formed of a steel casting, has a laterally extending hub portion 15 having a cross-section which may be as indicated in FIG. 2. The hub portion 15 of the wheel is provided with a hole 13 as generally indicated in FIG. 3 to receive the axle shaft 16 of the tractor. The axle shaft 16 is generally cylindrical and is provided with a pair of non-parallel, flat, chordally extending surfaces 17.

The hole 13 in the hub portion 15 of the wheel is provided with a pair of flat surfaces 19 adapted to wedge against the surfaces 17 of the axle shaft. When the wheel 10 is thus positioned on the axle 6, the wheel is centered on the shaft and engagement of the flat surfaces 19 of the wheel with the corresponding surfaces 17 of the shaft holds the wheel against rotation on the shaft. The construction as thus far described in the immediately preceding paragraphs is well known.

The hole 13 in the hub portion 15 of the wheel is laterally extended to receive wedge means for wedging the flat surfaces 19 of the wheel tightly against the corresponding surfaces 17 of the axle shaft 16. The wedge means includes a gib 20 which is adapted to be inserted within the hole in the hub portion 15. The gib 20 is received within a flat portion 21 of the hole and has a stepped portion 22 interlocking with a recess 24 in the hub portion 15 of the wheel to retain the gib against endwise movement. The gib 20 is generally coextensive with hub 15 as indicated in FIG. 2.

The face 25 of the gib confronting the axle shaft 16 is provided with a pair of spaced, flat, wedge surfaces 26. Preferably, lips 27 are formed on the outer ends of the wedge surfaces 26. The wedge surfaces 26 extend at a slight angle to the axis of the axle shaft 16.

A pair of wedges 29 extend between the wedge surfaces 26 of the gib and a cylindrical portion of the axle shaft 16. For this purpose, the wedges 29 have an arcuate surface 30 matching the curvature of the axle shaft 16 and an inclined wedge surface 31 coacting with the wedge surfaces 26 of the gib.

A bolt 32 is threadedly engaged with both of the wedges 29. Preferably, the bolt has a right-handed thread engaged with one of the wedges 29 and a left-handed thread engaged with the other wedge 29 so that rotation of the bolt in one direction will draw the two edges together while rotation of the bolt in the opposite direction will separate the wedges. Preferably, the bolt 32 has a head 34 for the purpose of rotating the bolt and is of stepped-diameter, the portion of the bolt adjacent the head 34 being of greater diameter than the opposite end of the bolt to facilitate assembly of the wedges 29 thereon.

Upon rotating the bolt 32 in one direction, the wedges 29 are moved towards each other along the inclined wedge surfaces 26 of the gib so as to clamp the flat surfaces 19 of the wheel tightly against the surfaces 17 of the axle shaft and prevent either rotation or longitudinal movement of the wheel 10 on the axle shaft 16. This arrangement permits a large mechanical advantage in tightening so that the wheel will resist loosening on the axle shaft.

In order to loosen the wheel 10 for adjustment of the wheel along the axle shaft to change the gauge or wheel spacing of the tractor, the bolt 32 is turned to move the wedges 29 apart along the gib 20. Normally, one wedge 29 will break loose from the gib before the other wedge. If this occurs, upon rotating the bolt 32 further in the same direction, the wedge 29 that has broken loose from the gib 20 will engage the adjacent lip 27 of the gib. When this occurs, additional rotation of the bolt 32 in the same direction will force the other wedge 29 loose from the gib so as to loosen the wheel 10 for adjustment along the axle shaft 16.

One of the advantages of the above construction is that the hub portion of the wheel requires no special machining for the wedge surfaces engaging the wedges 29. Further, provision of the gib 20 permits the use of a suitable alloy steel for the gib to resist wear by the wedges 29.

We claim as our invention:

1. A tractor adjustable gauge wheel adapted to be clamped to a generally cylindrical projecting axle shaft, the wheel having a hub apertured to receive the shaft, a gib received within the aperture of the hub, interfitting with the margin of the aperture and extending parallel to the shaft, the gib having a confronting surface provided with a pair of spaced wedge surfaces oppositely inclined at a slight angle to the axis of the shaft, a pair of wedges longitudinally spaced along the shaft and extending between the shaft and the wedge surfaces of the gib, and a bolt extending between and threadedly engaged with both wedges with the threads engaged with one wedge being of a different pitch than the threads engaged with the other wedge whereby turning the bolt in one direction moves the wedges into a clamping position to clamp the wheel tightly to the shaft and turning the bolt in the other direction moves the wedges into an unclamped position, the gib further being provided with projections at the ends of the wedge surfaces thereof for limiting movement of the wedges in the unclamping direction whereby both wedges may be displaced from the clamping position by rotation of the bolt.

* * * * *